United States Patent Office 3,450,774
Patented June 17, 1969

3,450,774
HYDROXYL-ENDED EPIHALOHYDRIN POLYMERS
Edwin J. Vandenberg, Wilmington, Del., assignor to Hercules Incorporated, Wilmington, Del., a corporation of Delaware
No Drawing. Continuation-in-part of application Ser. No. 562,514, July 5, 1966, which is a continuation-in-part of application Ser. No. 298,434, July 29, 1963. This application June 11, 1968, Ser. No. 736,026
Int. Cl. C08g *23/20, 23/06*
U.S. Cl. 260—615                               6 Claims

ABSTRACT OF THE DISCLOSURE

Low molecular weight, crystalline, double hydroxyl-ended poly(epihalohydrin) and particularly poly(epichlorohydrin) are produced by cleaving high molecular weight crystalline poly(epihalohydrin)s with alkali metal alkoxides, phenoxides, or hydroxides and then converting the end groups to hydroxyl groups, as by hydrolysis. The polymers are especially useful in chain extension reactions and in the preparation of polyurethane foams having improved properties.

---

This application is a continuation-in-part of my application Ser. No. 562,514, filed July 5, 1966, and now abandoned, which in turn is a continuation-in-part of my application Ser. No. 298,434, filed July 29, 1963, and now U.S. Patent No. 3,337,487.

This invention relates to crystalline polymers having terminal hydroxyl groups and, more particularly, to lower molecular weight hydroxyl-ended crystalline poly(epihalohydrin)s, and processes for producing the same.

High molecular weight crystalline polymers prepared by the polymerization of epihalohydrins are well known. However, these polymers contain at best no more than one active hydrogen end group per molecule. Thus, the amount of active hydrogen concentration in the polymer is so low as to be essentially ineffective as a means of modifying the polymer and in many cases cannot be detected. Obviously, any means by which the active hydrogen content of the polymer molecule can be increased greatly enhances the utility of the polymer.

Lower molecular weight liquid hydroxyl-ended epihalohydrin homopolymers have been produced heretofore. However, prior art polymers of this type have been limited in utility to elastomeric type products. It has now been found that hydroxyl-ended crystalline homopolymers of epihalohydrins make it possible to prepare hard, rigid products. In addition, these crystalline hydroxyl-ended homopolymers exhibit a much lighter and more desirable color than the prior art homopolymers and have highly reactive end groups. Low molecular weight, hydroxyl-ended crystalline homopolymers of epihalohydrins are particularly desirable due to their toughness, hardness, solvent resistance, heat resistance, ozone resistance, flame resistance, and the like.

Thus, in accordance with this invention, low molecular weight crystalline polymers having hydroxyl end groups on both ends of substantial numbers of the polymer molecules can be prepared by cleaving high molecular weight crystalline poly(epihalohydrin). This cleaving is effected by reacting the homopolymer with alkali metal alkoxides, phenoxides, or hydroxides under certain conditions which will be more fully discussed hereinafter. The low molecular weight hydroxyl-ended polymer products of this invention have number average molecular weights of between about 500–20,000 and are predominantly double hydroxyl-ended, i.e., a substantial portion (at least about 60%) of the polymer chains have hydroxyl groups at both ends thereof.

The poly(epihalohydrin)s of this invention provide an alternate site for cross-linking reactions, i.e., the halogen group. This is particularly advantageous where it is desired to have two different rates of cure, as the hydroxyl end groups can be used as one curing site and the halo group as the other. Further, the halogen atom provides an active site for attaching dyes, antioxidants, and the like to the polymers.

The low molecular weight crystalline diols of this invention are prepared as illustrated by the following equations for the cleavage of poly(epichlorohydrin) with an alkali metal compound, e.g., LiOR, wherein abstraction of hydrogens on a carbon atom beta to the ether linkage leads to cleavage. As will be seen, for any given ether linkage in the polymer chain, there are three positions wherein a hydrogen is attached to a carbon beta to the ether linkage, and hence there are three possible chain cleavage reactions, two involving cleavage on the left side of the ether linkage and one involving cleavage on the right side of the ether linkage. The three cleavage reactions involving these three beta hydrogens ($\beta_1$, $\beta_2$, and $\beta_3$) are shown below for two units in the polymer chain, the remainder of the polymer chain being R' and R'' in these equations.

Left side cleavage

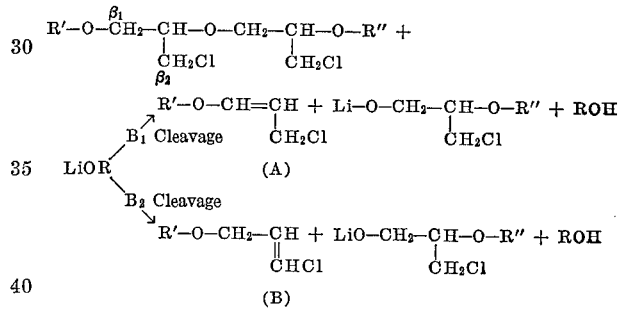

Right side cleavage

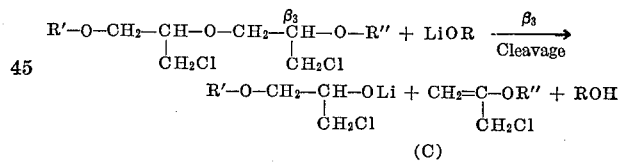

The lithium alkoxide end groups are readily converted by washing with an active hydrogen compound such as water, acid, alcohol, etc., to hydroxyl groups. The conversion of the lithium-ended cleaved product to a hydroxyl-ended compound by hydrolysis is illustrated by the following equation:

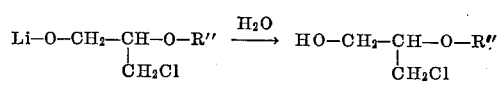

The chloropropenyl end groups (labeled A above) and the chloroisopropenyl end groups (labeled C above) are very readily removed to give hydroxyl end groups by acid washing in the manner which is typical of vinyl ethers. The conversion of chloropropenyl-ended cleaved product to a hydroxyl-ended compound and chloropropionaldehyde by acid hydrolysis is illustrated by the equation:

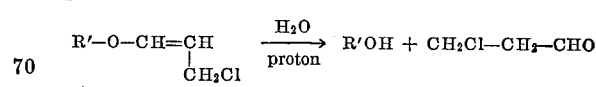

and the conversion of chloroisopropenyl-ended cleaved product to a hydroxyl-ended compound, and chloroacetone by acid hydrolysis is illustrated by the equation:

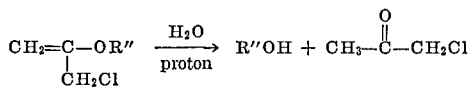

The low molecular weight by-product aldehyde (chloropropionaldehyde) and ketone (chloroacetone) are readily water-washed or volatilized out of the product. The chloroallyl end group (labeled B above) would not be removed by mild acid washing as used herein, but surprisingly this type of end group is not found in the cleavage product. Presumably, either the end group isomerizes under the influence of the cleavage agent or LiOR' or LiOR'' product to form a chloropropenyl group (A) which is readily removed by acid hydrolysis, or the end group is removed by cleavage or by displacement.

Following the hydrolysis of the cleaved polymers, the lower molecular weight polymers produced generally are predominantly hydroxyl-ended at both ends of the polymer chain. However, two other end groups may also be present, i.e., carbonyl (—C=O) and ethylnyl (—C≡CH) groups. Although applicant does not wish to be bound to any particular theory, it is believed that these groups are formed as a result of a small number of the following reactions occurring during cleavage (R' and R'' are again the remainder of the polymer chain).

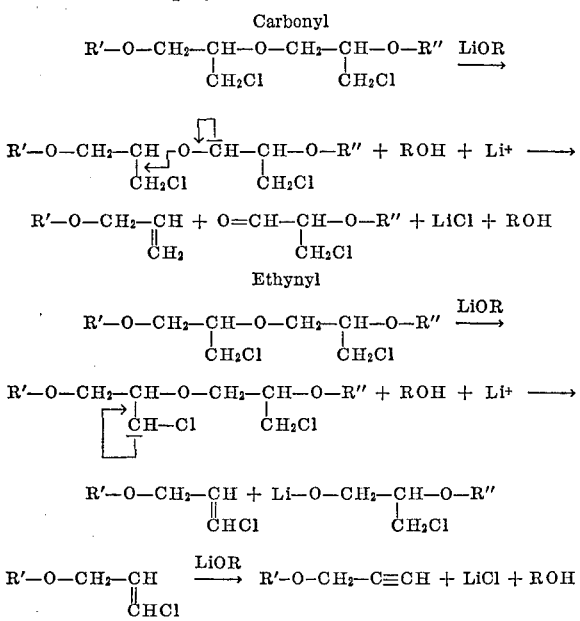

The carbonyl groups can be converted to hydroxyl groups in any convenient manner such as by treating with at least a stoichiometric amount and preferably a large excess of a reducing agent such as a chemical reducing agent or hydrogen, preferably under pressures ranging from atmospheric up to about 1000 atmospheres, and at temperatures ranging from ambient (about 25° C.) up to about 250° C. Preferred chemical reducing agents include lithium, sodium or magnesium aluminum hydride or sodium, lithium, potassium or aluminum borohydride. When hydrogen is used as the reducing agent, the hydrogenation is preferably carried out in the presence of typical hydrogenation catalysts, including nickel, platinum, palladium, ruthenium, rhodium, and the like, either using these materials as is or on conventional supports. This conversion is illustrated by the following equation:

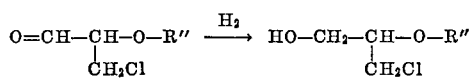

By the proper selection of cleaving compounds and reaction conditions, in the manner described and illustrated herein, the presence of undesirable ethynyl groups can be eliminated or at least minimized. Further, the ethynyl-free portion of the polymer can be separated from the portion which contains ethynyl end groups either by thin layer chromatography or by conventional chromatography techniques. In either case, such materials as silver nitrate, copper salts such as cupric chloride, and mercury salts (mercuric), on appropriate chromatographic supports such as kieselguhr, silca gel, or aluminum oxide, are used. In conventional chromatography, a solution of the polymer is passed through a bed of the support containing the silver nitrate or the like. The polymer chains containing ethynyl groups can also be reduced or removed by solvent fractionation.

The crystalline poly(epihalohydrin)s which can be cleaved to produce the double hydroxyl-ended lower molecular weight polymers of this invention are well known and will contain sequences of at least 100 and preferably at least 1000 monomer units having the following general formula:

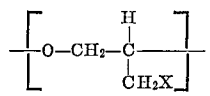

where X is a holgen atom selected from fluorine, chlorine, bromine, and iodine. Exemplary of the polymers that can be cleaved to produce the products of this invention are the crystalline poly(epihalohydrin)s such as poly(epifluorohydrin), poly(epibromohydrin), poly(epiiodohydrin) and preferably poly(epichlorohydrin) obtained by polymerizing an epihalohydrin in the presence of iron compounds or a variety of aluminum alkyls, as for example, according to the methods of Baggett et al., U.S. Patent 2,871,219; or Vandenberg, U.S. Patents 3,135,705; 3,218,269; and 3,280,045. The crystalline polymers are believed to be predominantly isotactic, i.e., they contain long sequences of d or l asymmetric carbon atoms in the polymer chain. Normally, as isolated, the isotactic polymer is a mixture of d and l chains. Syndiotactic polymers, i.e., polymers having chains of alternating d and l asymmetric carbon atoms can also be cleaved by the process of this invention. Preferably, the polymer that is cleaved will be one of fairly high molecular weight so that the original end groups in the polymer being cleaved are an insignificant portion of the total final end groups. The major portion of the individual polymer molecules in the cleaved product will then have hydroxyl end groups on both of their ends. The actual molecular weight of the polymer being cleaved and the number of cleavages per polymer molecule will, of course, depend on the purpose for which the final polymer is to be used.

The cleavage process used to produce the polymers of this invention is carried out by reacting the above-described polymers with an alkali metal alkoxide, phenoxide, or hydroxide. Any alkali metal, i.e., lithium, sodium, potassium, rubidium, or cesium, can be used. Exemplary of the alkali metal alkoxides, phenoxides, and hydroxides which can be used are sodium, or lithium methoxide, ethoxide, isopropoxide, or n- or t-butoxide, sodium or lithium phenoxide, lithium hydroxide, sodium hydroxide, potassium hydroxide, and the like. The amount of the cleaving compound used will depend upon the amount of cleavage desired, at least one molecule of the cleaving compound being required for each cleavage, i.e., per two chain ends. Thus, the amount of cleaving compound can vary from about 1% up to a large excess, as for example, 5 to 10 times the weight of the polymer being cleaved, but preferably will vary from about 1% to about 100% by weight of the polymer being cleaved.

The cleavage process can be carried out in the absence of a diluent, i.e., a bulk process, but preferably is carried out in a diluent, which can be a solvent for the polymer being cleaved or which can serve only as a dispersant for the polymer. Any organic liquid diluent that is inert under the reaction conditions can be used, as, for example, aromatic hydrocarbons such as benzene, toluene, xylene, etc.; aliphatic and cycloaliphatic hydrocarbons such as hexane, n-heptane, cyclohexane, etc., and mixtures of such hydrocarbons, as, for example, petroleum ether, gasoline, ketones such as acetone, methyl ethyl ketone, diethyl ketone, hexanone-2 or -3, benzophenone, cyclohexanone, and the like; sulfoxides such as dimethyl sulfoxide; ethers including the cyclic ethers such as tetrahydrofuran, dioxane, etc., the aromatic ethers such as anisole, phenetole, etc.; and the aliphatic ethers such as diethyl ether, dimethyl ether of diethylene glycol, diethyl ether of diethylene glycol, etc.; amides such as dimethyl formamide, etc. The concentration of the polymer in the diluent can vary from a fraction of 1% up to an essentially diluent-free system. As already mentioned, the polymer can be dissolved in the diluent or a slurry of the polymer in a diluent can be used. Generally, it is preferred to use conditions such that the polymer solution or dispersion is stirrable. Usually the polymer concentration will be in the 2 to 50% range. As noted above, the process can be operated in the absence of a diluent or by carrying out the process in an extruder, after which the cleaved fluid product can be handled in more conventional equipment in a continuous process.

The cleavage of the crystalline poly(epihalohydrin) can be carried out over a wide temperature range, generally from about −50° C. to about 200° C., depending on the reactivity of the polymer and the organometallic compound, the stability of the organometallic compound, etc. Preferably, the reaction is carried out at a temperature of from about −20° C. to about 150° C., and more preferably from about 0° C. to about 100° C. The pressure can be atmospheric, subatmospheric or above atmospheric, as desired. In fact, pressures up to several thousand pounds can be used if needed to keep the diluent in the liquid state.

Through the use of the above-described cleavage reaction, a polymer having hydroxyl groups on both ends of the polymer chain can be obtained, provided the proper isolation procedure is also used. Thus, appropriate isolation conditions must be used to remove or hydrolyze off the propenyl or isopropenyl end groups. This is very readily accomplished by simply washing the reaction mixture after the cleavage reaction with a weak acid solution which can be a solution of a weak acid or a dilute solution of a strong acid, there being used an amount of said acid solution such that pH of the reaction mixture is below about 6 and most preferably below about 5. The precise pH used, of course, will vary depending upon such factors as rate of reaction, temperature of the reaction mixture, time, etc. Any compound which yields protons when dissolved in water can be used for the washing step. Preferably, the aqueous acid solution is a dilute solution of an organic or inorganic acid or an acid salt, as for example, a dilute solution of a mineral acid such as hydrochloric acid, nitric acid, sulfuric acid, sulfurous acid, nitrous acid, phosphoric acid, etc.; a fatty acid such as formic acid, acetic acid, etc.; a dibasic acid such as oxalic acid, a sulfonic acid, carbonic acid; an aqueous solution of an acid salt such as an acid phosphate or acid sulfate, etc. In the case of the chloropropenyl end groups, more drastic hydrolysis conditions are sometimes required, as for example, the use of a higher acid concentration and elevated temperatures. Carbonyl end groups and ethynyl end groups are removed from the cleaved polymer in the manner heretofore described.

The hydroxyl-ended crystalline poly(epihalohydrin)s of this invention contain sequences of at least 5 monomer units per molecule up to any desired chain length. In general, they will have a number average molecular weight of from about 500 up to about 20,000, and preferably from about 1,000 to about 10,000.

The products of this invention are substantially double hydroxyl-ended. Thus, at least about 60%, preferably at least about 80%, and more preferably at least about 90%, of the polymer chains have hydroxyl groups at both ends thereof (i.e., they are double hydroxyl-ended chains). The remaining chains contain no hydroxyl groups or can be monohydroxyl-ended; however, a low monohydroxyl-ended chain content is preferred.

The following examples illustrate the preparation of the hydroxyl-ended polymers of this invention. All parts and percentages are by weight unless otherwise indicated. All examples were run under a nitrogen atmosphere. The molecular weight of the polymers is indicated by their reduced specific viscosities (RSV). By the term "reduced specific viscosity" is meant $\eta_{sp./c.}$ determined on a 0.1% solution in α-chloronaphthalene at 100° C. unless otherwise indicated. The number average molecular weight (Mn) was determined in chloroform at 37° C., using a Mechrolab osmometer, unless otherwise noted. The calculated Mn was calculated from the hydroxyl analysis assuming 2 hydroxyls per chain. Hydroxyl analysis was determined by infrared analysis in dichloromethylene using 2-chloroethanol as the reference, and carbonyl analysis was determined based on average absorptivity based on chloroacetone and propionaldehyde. Where the melting point and heat of fusion of the polymer are given, they were determined by differential thermal analysis (DTA).

Example 1

Five (5) parts of a crystalline poly(epichlorohydrin) which was highly cyrstalline by X-ray, at least 61% crystalline by infrared and 95% insoluble in acetone (as determined by recrystallization from acetone at −20° C.), had an RSV of 6.7 and a melting point of about 115° C. and contained 0.3% of 4,4′-thiobis-(3-methyl-6-tert-butyl phenol) as stabilizer, was dissolved in 138 parts of dimethylsulfoxide at 65° C. Then 0.96 part of sodium methoxide in 9 parts of dimethylsulfoxide was added. The reaction mixture was stirred for 6 hours at 65° C.; then 20 parts of 10% aqueous hydrogen chloride was added, and the mixture allowed to cool to room temperature with continued stirring, after which 130 parts of 10% aqueous hydrogen chloride and 2 volumes of water were added. The insoluble portion was collected, washed neutral with water, and the product dried at 80° C. for 16 hours under vacuum.

The hydroxyl-ended poly(epichlorohydrin) so obtained was 2.4 parts of a waxy solid, had an RSV of 0.07, and was shown to be highly crystalline by X-ray. It had a crystalline melting point of 82.5° C., a heat of fusion of 1.04 calories/gram, and a molecular weight (Rast) of 658. On infrared analysis the product contained 4.2% hydroxyl groups, 2.0% carbonyl groups, and no acetylenic end groups, indicating that at least 78% of the total number of chain ends were hydroxyls (i.e., at least 56% of the product had 2 hydroxyls per chain).

Part of the crude product of this example was reduced in the following manner. Into a pressure vessel under nitrogen containing 0.2 part of lithium aluminum hydride in 35 parts of dry tetrahydrofuran at room temperature 1.93 parts of the crude polymer dissolved in 8.8 parts of tetrahydrofuran by heating was injected and rinsed in with 4.4 parts of tetrahydrofuran. The reaction mixture was stirred for 1 hour at roo mtemperature with venting; then 5 parts of water was added. The solvent was next stripped off, 8.7 parts of toluene added, and the reaction mixture washed twice with 3% aqueous hydrogen chloride and then neutral with water. After heating on a steam bath to dissolve the polymer, the polymer solution was filtered at 65° C., the solvent stripped off, and the product dried at 80° C. for 16 hours. The product, which was 1.71 parts of a soft wax, had a number average molecular weight of 1070, a melting point of 99° C., heat of fusion of 7.2 calories/gram, and on infrared analysis was shown to contain 2.9% hydroxyl groups, 0.14% carbonyl groups, and no acetylenic end groups, indicating 97% of the end groups were hydroxyls and that at least 95% of the product was double hydroxyl-ended.

Example 2

The procedure of Example 1 was repeated except that in this example, 0.32 part of sodium methoxide was used and that after the second addition of the aqueous hydrogen chloride, 3 volumes of water and 90 parts of toluene were added and the mixture stirred for 5 minutes, washed neutral with water, stripped of solvent, and dried. The product comprised 4.7 parts of white solid which on infrared analysis was shown to contain 0.35% hydroxyl groups and 0.64% carbonyl groups and which had an RSV of 0.28, high crystallinity by X-ray diffraction, and an Mn of 3800 determined by the boiling point method in acetone (calculated 4600 based on total end groups).

Two (2) parts of this product were reduced with lithium aluminum hydride according to the procedure of Example 1 except that 22 parts of toluene were used after stripping off the tetrahydrofuran. The product was 2 parts of a white resilient solid of high crystallinity (X-ray), an Mn of 3960 (boiling point method in acetone), a melting point of 111.5° C., heat of fusion of 6.9 calories/gram, and on infrared analysis was shown to contain 0.53% hydroxyl groups and 0.17% carbonyl groups, indicating that 78% of the product was double hydroxyl-ended. The calculated molecular weight, based on the hydroxyl and carbonyl group analysis, gave 5400.

Example 3

Four (4) parts of the crystalline poly(epichlorohydrin) of Example 1 was dissolved under nitrogen in 260 parts of dry toluene by refluxing with agitation, after which the solution was cooled to an internal temperature of −74° C. with agitation under nitrogen using a Dry Ice-acetone bath. Next, 0.77 part of butyllithium in 4.8 parts of hexane was added with stirring over 6 minutes to the cooled solution and the mixture stirred for a total time of 4.5 hours. Then 50 parts of 10% aqueous hydrogen chloride was added, and the reaction mixture warmed to room temperature and washed neutral with water. The insoluble portion was collected, washed with toluene and then once with toluene containing 0.02% 4,4′-thiobis(3-methyl-6-tert-butyl phenol) and dried at 80° C. under vacuum for 16 hours. There was obtained 1.94 parts of a hard brittle solid which on infrared analysis was shown to contain 38.4% chlorine, 0.28% hydroxyl groups, 0.39% carbonyl groups, and no detectable ethynyl end groups (less than 0.03%), and which had a number average molecular weight of 7340 (calculated 6500), a melting point of 113° C., and a heat of fusion of 15.2 calories/gram.

The toluene-insoluble product was then reduced with lithium aluminum hydride according to the procedure of Example 1 and gave a hydroxyl-ended product which analyzed 0.53% hydroxyl groups and no carbonyl groups, indicating that greater than 95% of the product was double hydroxyl-ended and a calculated molecular weight of 6800.

The toluene-soluble fraction was also recovered by stripping and drying to give 0.39 part of a soft greaselike solid which analyzed 3.2% hydroxyl groups, 4.1% carbonyl groups, and 0.99% ethynyl end groups. The calculated molecular weight, based on total end groups, was 530.

The toluene-soluble fraction was then reduced with lithium aluminum hydride according to the procedure of Example 1 and the fraction recovered by stirpping and drying. The product contained 5.5% hydroxyl groups, indicating that at least 80% of the product was double hydroxyl-ended and had a molecular weight of 600.

The foregoing examples demonstrate the production of low molcelular weight crystalline poly(epihalohydrin)s having hydroxyl end groups at both ends of the polymer chains. Thus, this invention provides a ready source of hydroxyl-ended polymers, which are useful in chain extension reactions. The chain-extending agent can be any polyfunctional compound which reacts under appropriate temperature, pressure, and catalyst with hydroxyl groups. They can be di- or polyisocyanates such as m- or p-phenylene diisocyanate, 2,4-toluene diisocyanate, 1,5-naphthyl diisocyanate, methylene di(p-phenyl diisocyanate), hexamethylene diisocyanate, triphenyl methane triisocyanate, etc.; di- or polyepoxides such as Epon resins, as for example, the diglycidyl ether of Bisphenol A, or di- or triaziridines, as for example, tris[1-(2-methyl) aziridinyl] phosphine oxide, tris(1-aziridinyl)phosphine oxide, or di- or polyanhydrides such as pyromellitic anhydride, or di-or polyimides such as phenylene bis-maleimide, etc. The difunctional chain-extending agents are generally used in approximately stoichiometric amounts to the active chain ends when a linear, soluble high polymer product is desired. When the chain-extending agent contains more than 2 functional groups and is used in approximately stoichiometric amounts to the active chain ends, the product is generally a cross-linked product. Alternatively, a cross-linked network can be obtained by using a combination of a difunctional active chain end polymer with low molecular weight similar polyreactive compounds. Thus, the polymers of this invention having hydroxyls on both ends of the polymer chain, on combination with a polyol such as glycerin, pentaerythritol, trimethylol propane, sorbitol, tetrakis(2-hydroxypropyl) ethylene diamine, or ethylene oxide or propylene oxide adducts of these polyols in combination with the diisocyanate will yield a cross-linked polyurethane network.

Cross-linked or chain-extended products prepared by the use of the hydroxyl-ended polymers of this invention can advantageously include fillers (such as silicas, aluminas, clays, etc.), antioxidants, stabilizers, plasticizers, acid acceptors, and the like.

The hydroxyl chain-ended polymers of this invention can also be converted to useful polyester and polyamide block copolymers by the usual polyester and polyamide forming reactions, using either a simple monomeric unit such as the phthalic acids or esters, or using preformed polyesters or polyamides with appropriate reactive chain ends. Interfacial polymerization is advantageously used to prepare such materials by using acid chlorides of dicarboxylic acids or of carboxy-ended polyesters or polyamides with the hydroxyl chain-ended polymers. Alternatively, an amine-ended polyamide can be reacted with the chloroformate-ended polymer (formed by the reaction of the hydroxyl-ended polymer with phosgene) to give polyether-polyamide block copolymer joined by polyurethane links. The chloroformate-ended polymer can also be reacted by interfacial polymerization with hydrazine or simple diamines to form polyurethane-type products. The hydroxyl-ended polymers can also be end-capped, by reaction with at least 2 moles of a di- or polyisocyanate, to give a product with reactive isocyanate end groups which can then be reacted with a diamine such as hydrazine, ethylene diamine, phenylene diamine, etc., or an amine-ended polyamide to give block-type copolymers containing urea links which are advantageous for increasing the softening point and improving the abrasion resistance of the polymer.

The crystalline hydroxyl-ended polymers produced as described above from crystalline poly(epihalohydrin)s are especially useful in the preparation of polyurethane foams, which may be prepared as rigid, semi-rigid, or elastomeric foams. Because of their crystallinity and high melting points, these new hydroxyl-ended polymers give final products which are advantageous over a wider temperature range than conventional foams. These new crystalline hydroxyl-ended polymers are particularly useful in the preparation of improved polyurethane foams when used in combination with amorphous poly(propylene glycol), or amorphous propylene oxide adducts of various polyols, to give depending on the composition, rigid, semi-rigid, or elastomeric products. The elastomeric foams are outstanding because of their improved tensile and tear strength and improved recovery characteristics. In rigid or semi-rigid foams, these crystalline hydroxyl-ended polymers can be the sole or major diol component combined with a diisocyanate, such as toluene diisocyanate, or a diisocyanate in combination with a small amount of a polyol such as trimethylol propane or glycerine, etc. Conventional rigid or semi-rigid foams based on amorphous poly(propylene glycol) are highly cross-linked by including large amounts of polyols and/or polyisocyanates. The rigid or semi-rigid foams of the crystalline hydroxyl-ended polymers of epichlorohydrin do not require a high degree of conventional cross-linking and thus are tougher and hence more useful at ordinary temperatures. The crystalline hydroxyl-ended polymers can also be used for the preparation of cast articles, for coatings, for binders, as for example, for rocket propellants, and for elastomeric fibers, films, etc.

The crystalline hydroxyl-ended polymers of this invention can be further modified to yield useful products. For example, they may be reacted in the presence of a base with other epoxides such as ethylene oxide, propylene oxide, butene-1 oxide, etc. Such adducts may be just diadducts to convert the hydroxyl end groups to more reactive hydroxyethyl (ethylene oxide reaction) or hydroxypropyl (propylene oxide reaction) end groups. Such products, because of their reactivity with isocyanates, are especially useful for foam, particularly for the very useful one-shot foam processes. The adducts may consist of large blocks (5 to 100 units) of ethylene oxide, amorphous propylene oxide, amorphous butene-1 oxides, etc. Such block polymers containing the crystallizing hydroxyl-ended units of this invention are unique and are unusually useful surface-active agents, adhesives, and protective colloids. The ethylene oxide type are especially useful as unique detergents, dispersing agents, antistatic agents, dyeing aids, additives or coatings for fibers to prevent soil redeposition during laundering, etc.

The above products can be made directly following the cleavage reaction when conditions are such that the product formed contains largely metal alkoxide end groups. The cleaved product can be concentrated, if desired, and reacted directly with the desired alkylene oxide under appropriate conditions of concentration, temperature and time, depending on the alkylene oxide and the product desired. The metal alkoxide end-group products from the cleavage reaction may also be used to make other useful block polymers by reaction with styrene, acrylates, methacrylates, acrylonitriles, and acrylamides.

The hydroxyl-ended polymers of this invention may be reacted with phosgene to give chloroformates which may be further reacted with diamines to form polyurethanes, with dialcohols to form polyesters, or with sodium azide to give a reactive azide end group.

Other applications and uses for these cleavage products will be readily apparent to those skilled in the art from the above disclosure.

What I claim and desire to protect by Letters Patent is:

1. The process of preparing a crystalline, predominantly double hydroxyl-ended poly(epihalohydrin) which comprises cleaving a crystalline poly(epihalohydrin), by (1) reacting a crystalline poly(epihalohydrin) containing sequences of at least 100 monomer units having the formula

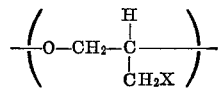

where X is halogen, at a temperature of from about −50° C. to about 200° C. in the presence of an inert liquid organic diluent with an alkali metal compound selected from the group consisting of alkoxides containing from 1 to 4 carbon atoms, phenoxides, and hydroxides, and (2) washing the reaction mixture with an aqueous acid solution at a pH below about 6 prior to separating the product from the organic diluent.

2. The process of claim 1 wherein the poly(epihalohydrin) is poly(epichlorohydrin).

3. The process of claim 1 wherein, after separating the product, it is treated with a reducing agent in an amount sufficient to reduce any carbonyl end groups in said product to hydroxyl end groups and then the double hydroxyl-ended polymer is isolated.

4. The process of claim 3 wherein the poly(epihalohydrin) is poly(epichlorohydrin).

5. The low molecular weight hydroxyl-ended crystalline poly(epihalohydrin) having a number average molecular weight between about 500 and about 20,000 and having predominantly double hydroxyl-ended polymer chains produced by the process of claim 1.

6. The composition of claim 5 wherein said poly(epihalohydrin) is poly(epichlorohydrin).

References Cited

UNITED STATES PATENTS

| | | |
|---|---|---|
| 2,871,219 | 1/1959 | Baggett et al. |
| 3,149,083 | 5/1964 | Gmitter. |
| 3,158,850 | 11/1964 | Vandenberg. |
| 3,219,634 | 11/1965 | Watson et al. |

OTHER REFERENCES

Dow Chemical Co., Choosing the Right Polyol, August 1956, pp. 1–15, Code No. 164–33.

LEON ZITVER, *Primary Examiner.*

HOWARD T. MARS, *Assistant Examiner.*

U.S. Cl. X.R.

117—139.5; 252—8.9, 89, 351; 260—2, 2.5, 37, 75, 77.5, 78, 78.4, 830